Aug. 19, 1958 E. KEONJIAN 2,848,564

TEMPERATURE STABILIZED TRANSISTOR AMPLIFIER

Filed July 27, 1954

INVENTOR:
EDWARD KEONJIAN,

BY George V. Eltgroth
HIS ATTORNEY.

United States Patent Office 2,848,564

Patented Aug. 19, 1958

2,848,564

TEMPERATURE STABILIZED TRANSISTOR AMPLIFIER

Edward Keonjian, Syracuse, N. Y., assignor to General Electric Company, a corporation of New York Application July 27, 1954, Serial No. 446,139

7 Claims. (Cl. 179—171)

Figure 1:
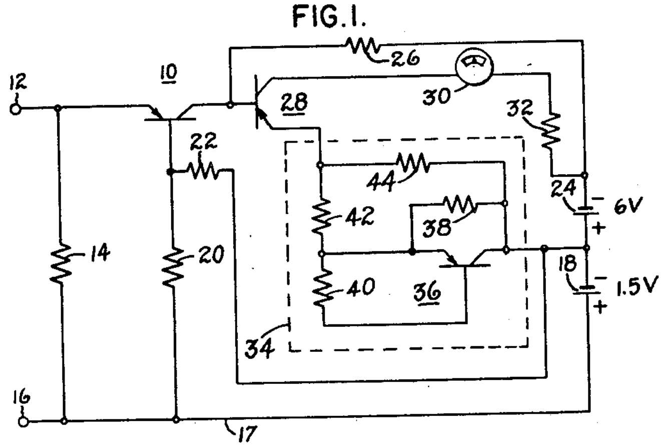

This invention relates to amplifiers whose parameters vary with temperature and more particularly to compensation of thermally induced variations in the relationship between input signals and output indications.

In solid state amplifiers involving the use of a reversely biased junction, such as the collector junction, it is observed that the current flow through such junction is a function of temperature. This is believed due to the thermal generation of hole-electron pairs. When a high degree of amplification is desired, it becomes necessary to use more than a single amplifier stage, so that a plurality of such amplifying devices are connected in cascade. In signal responsive networks of this type, it has been found that changes in temperature may cause considerable changes in the current flowing in the output stage of the amplifier, quite independently of the presence of any signal change at the input terminals to such amplifier. Such phenomena may also exist in other electric valve structures now and hereafter appearing in the art.

Accordingly, it is the principal object of this invention to provide a new and novel amplifier network, the input-output relationship of which is substantially unaffected by temperature over an extended range.

It is a further object of the invention to provide an improved network for the connection of solid state amplifying devices in cascade.

Still another object of the invention is to provide improved means for the compensation of thermal drift in direct coupled amplifiers.

Figure 2:
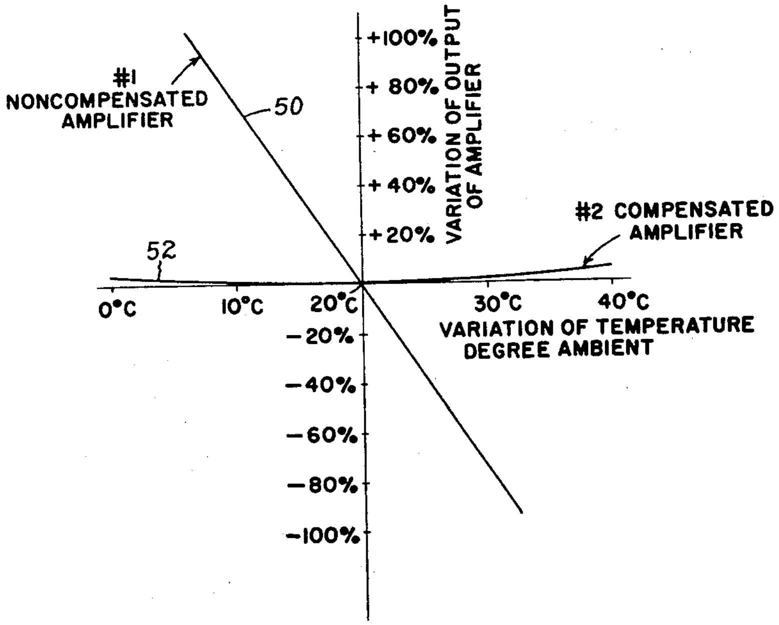

These and other objects and advantages of the invention will be more fully discussed in, and others will become apparent from the study of, the following specification when read in conjunction with the drawings, which show a specific embodiment for the purpose of illustrating the principles of the invention. The invention is pointed out with particularity in the appended claims. In the drawings:

Fig. 1 is a schematic diagram describing an amplifier network embodying the principles of the invention; and Fig. 2 is a graphic illustration illustrating the difference of thermal influence on the output current of an uncompensated amplifier as compared with the amplifier of Fig. 1.

Referring now more specifically to Fig. 1, there is shown a transistor 10 of the p-n-p type having its emitter electrode connected with an input terminal 12. A resistor 14, which may have a value of about 100 ohms, connects the input terminal 12 with input terminal 16, in turn linked over the line 17 with the positive pole of source 18, which may have a potential of 1.5 volts. A resistor 20, which may have a value of 80 ohms is connected between the base electrode of the transsistor 10 and the line 17 and base electrode of transistor 10 is also connected with the negative pole of the source 18 through a resistor 22 which may have a value of 620 ohms. A further source of direct current potential 24, which may have a potential of 6 volts, has its positive pole connected with the negative pole of source 18, and its negative pole connected through resistor 26, which may have a value of about 6000 ohms, with the collector electrode of transistor 10.

The collector of transistor 10 is further connected with the base of an additional transistor 28. The collector of transistor 28 is linked with the negative terminal of the source 24 through a current indicating device 30 and a resistor 32, whose combined resistances may be about 100 ohms. A network enclosed within the dashed rectangle 34 is connected between the emitter electrode of transistor 28 and the negative pole of the source 18. This network comprises an additional transistor 36 having a resistor 38, which may be about 1200 ohms, connected between its emitter and collector electrodes, a resistance 40 which may be about 8600 ohms connected between its emitter electrode and associated base electrode, and a resistor 42 which may be about 62 ohms having one end connected with the junction between resistors 38 and 40. The collector electrode of transistor 36 is connected with the junction between the sources 18 and 24, while the end of resistance 42 remote from the junction of resistances 38, 40 is connected with the emitter of transistor 28. There may be also included a resistor 44 of about 100,000 ohms connected between the negative terminal of source 18 and the emitter electrode of transistor 28. However, if precise compensation in the low temperature region of operation is not required, the resistor 44 may be omitted.

The resistors 20, 22 comprise a voltage divider supplying the necessary operating potential to the input transistor 10, while the resistor 26 is a part of the load network for transistor 10, the balance of the load consisting of the base circuit impedance presented by transistor 28. As is well known, the apparent base circuit impedance is significantly affected by the associated circuitry connected with other portions of the transistor and will, in the present instance, be considerably influenced by the impedance of the network enclosed within the rectangle 34.

The apparatus just described functions as a two-stage cascade connected amplifier in which the amplified output derived from transistor 10 serves as the input to the amplifier stage including transistor 28, and temperature induced changes in the collector current to transistor 28 arising out of changing intrinsic conduction in transistor 28 and in transistor 10 are eliminated over a wide range of ambient temperatures by the action of the temperature variable emitter resistance provided by the network 34. The transistors 10 and 28 employed in the operational embodiment of Fig. 1 have the following characteristics:

| | | $\alpha$ | $r_c$ | $r_b$ | $r_e$ | $I_{co}$ |
|---|---|---|---|---|---|---|
| Transistor | #10 | 0.96 | 1 meg. | 600 | 20 | 6$\mu$A |
| Transistor | #28 | 0.94 | 140 K | 340 | 32 | 40$\mu$A |

With these transistors used in the illustrated circuit the current flowing through indicating instrument 30 was found to be very nearly independent of temperature changes when the resistance between the emitter of transistor 28 and the negative pole of the source 18 varied according to the relationship:

$$R=\frac{5400}{I_0}+\frac{369000}{T+\sqrt{38.5\,I_0}}\text{ ohms}$$

where $I_0$ is in milliamperes and expresses the current flowing through the indicating device 30 in the absence of any signal potential between the terminals 12, 16 and T is the temperature in ° C. While this equation expresses with considerable precision the temperature-resistance characteristic of the network required between the emitter of transistor 28 and the negative pole of the source 18 for the high degree of immunity to variations in ambient temperature achieved in the present invention, the constants in the relationship change with the use of different component values and the presence of transistors having somewhat different characteristics so that the expression is properly expressed generally as:

$$R=\frac{A}{I_0}+\frac{B}{T+CI_0}\text{ ohms}$$

where $I_0$ and T correspond respectively to the current and temperature as noted above and A, B and C are constants, B being greater than A and C being less than A. The network shown within the dash line enclosure 34 provides this temperature-resistance characteristic.

The requirement for such a characteristic grows out of the fact that collector current variations in transistor 10 arise in part from signal induced variations in emitter current and in part from thermally induced intrinsic conductivity within the body of the semiconductor. Thus if the input potential is held constant while the ambient temperature is varied there results a change in the collector current flow in transistor 10 appearing at the transistor 28 as a change in base voltage to produce a change in the current flowing through the indicating device 30, despite the constant potential applied between terminals 12, 16.

In the system of Fig. 1, a current flows from the emitter to the base of transistor 10 in the absence of any signal potential applied to input terminals 12, 16. As a consequence, substantial collector current flows in the transistor 10, causing the collector of transistor 10 and the associated base of transistor 28 to become more positive than under conditions where no emitter current flows into transistor 10. This relatively positive base potential gives rise to reduced emitter circuit current in the transistor 28 and correspondingly low current flow through the collector circuit including resistor 32 and indicating device 30.

As noted earlier, it is this rest current or current in the absence of applied signals between terminals 12, 16 which appears as $I_0$ in the resistance defining relationships. In the circuit just described, using the transistors whose characteristics are given above, this rest current was observed to be about 3.0 milliamperes.

As the potential between terminals 12, 16 is changed negatively from the free values the emitter current in transistor 10 diminishes, causing the collector of transistor 10 and associated base of transistor 28 to become more negative thereby to increase the emitter current flow in transistor 28 and the flow of current through indicating device 30. Increasingly negative signals applied between terminals 12, 16 therefore give rise to an increasing magnitude of current flow through the indicating device 30.

An increase in ambient temperature, assuming no change in potential across terminals 12, 16, causes an increase in the flow of collector current to the transistor 10 as the result of the increased intrinsic thermal conduction within the solid state semi-conductor body. This change tends to diminish the emitter current flowing in the transistor 28 and to correspondingly diminish the collector current flowing in the transistor, at the same time, the increase in intrinsic collector-base conduction in the transistor 28 tends to somewhat increase the collector current flowing thereto. The net effect of these two influences on the collector current of transistor 28 is compensated by a decrease in the resistance presented by the network within the rectangle 34, so that the collector current of transistor 28 for a given input voltage at terminals 12, 16 remains sensibly constant over a wide range of ambient temperatures.

The emitter and collector connections of the transistor 36 within the network 34 may be interchanged with only minor readjustment of the component values associated therewith. While p-n-p germanium transistors have been used for the purposes of illustration, it is obvious that n-p-n transistors may also be effectively employed with appropriate readjustment in exciting potentials. Further, other semi-conducting materials characterised by thermally induced intrinsic conductivity may also be used in this network.

This temperature compensation is highly effective as will become apparent from a study of Fig. 2 in which the curve 50 illustrates the change in current flowing through the indicating device 30 with no signal applied between terminals 12, 16, when a fixed resistor is inserted between the emitter of transistor 28 and the negative pole of the source 18 in place of the complex network 34 shown in Fig. 1. The rest or residual current under these conditions more than doubles with respect to that observed at 20° C. with only a 15° C. fall in ambient temperature. When the ambient temperature is increased, the rest or residual current very nearly vanishes (changes by minus 100%) as the ambient temperature reaches a value less than 20° C. higher than the reference ambient temperature. This change in current is reduced to a bare few percent with the network in rectangle 34 connected between the emitter of transistor 28 and the negative pole of source 18, as is illustrated by the curve 52, showing that a huge and intolerable error has been reduced to a very small value indeed.

The specific embodiment shown and discussed has been chosen to illustrate the principles of the invention. As is well known to those skilled in the art, the array and disposition, number or character of elements may be varied to meet particular operating or environmental requirements without departing from the essence of the invention.

What is claimed as new and to be secured by Letters Patent of the United States is:

1. In a signal responsive device; a first solid state electric valve provided with at least two mutually reactive rectifying junctions associated with a first common base; a first network applying a potential across one of said junctions in the sense of minimum conductivity; a second network comprising a second solid state electric valve provided with electrodes forming at least two mutually reactive rectifying junctions associated with a second common base, a first resistor conductively connected between said junction electrodes, a second resistor conductively connected between one of said junction electrodes and said second base, and a third resistor conductively connected at one end with the junction between said first and second resistors; and means including said second network for applying a potential across the other of said junctions in said first solid state electric valve in the sense of maximum conductivity in which the points of conductive connection to said second network are at the free end of said third resistor and the other of the junction electrodes of said second solid state electric valve.

2. In a signal responsive device; a first solid state electric valve provided with at least two mutually reactive rectifying junctions associated with a first common base; a first network applying a potential across one of said junctions in the sense of minimum conductivity; a second network comprising a second solid state electric valve provided with electrodes forming at least two mutually reactive rectifying junctions associated with a second common base and characterized by the same polarities as said first mentioned rectifying junctions, a first resistor conductively connected between said second junction electrodes, a second resistor conductively connected between one of said second junction electrodes and said second base, and a third resistor conductively connected at one end with the junction between said first and second resistors; and means including said second network for applying a potential across the other of said junctions in said first solid state electric valve in the sense of maximum conductivity in which the points of conductive connection to said second network are at the free end of said third resistor and the other of the junction electrodes of said second solid state electric valve.

3. In a signal responsive device; a first solid state electric valve provided with at least two mutually reactive rectifying junctions associated with a first common base; a first network including a load device applying a potential across one of said junctions in the sense of minimum conductivity; a second network comprising a second solid state electric valve provided with electrodes forming at least two mutually reactive rectifying junctions associated with a second common base, a first resistor conductively connected between said junction electrodes, a second resistor greater than said first resistor conductively connected between one of said junction electrodes and said second base, a third resistor smaller than said first resistor conductively connected at one end with the junction between said first and second resistors; and means including said second network for applying a potential across the other of said junctions in said first solid state electric valve in the sense of maximum conductivity in which the points of conductive connection to said second network are at the free end of said third resistor and the other of the junction electrodes of said second solid state electric valve.

4. In a signal responsive device; a first solid state electric valve provided with at least two mutually reactive rectifying junctions associated with a first common base; a first network including a load device applying a potential across one of said junctions in the sense of minimum conductivity; a second network comprising a second solid state electric valve provided with electrodes forming at least two mutually reactive rectifying junctions associated with a second common base, a first resistor connected between said junction electrodes, a second resistor having a magnitude approximately seven times greater than said first resistor connected between one of said junction electrodes and said second base, and a third resistor having a magnitude approximately one twentieth as great as said first resistor connected at one end with the junction between said first and second resistors; and means including said second network for applying a potential across the other of said junctions in said first solid state electric valve in the sense of maximum conductivity in which the points of connection to said second network are at the free end of said third resistor and the other of the junction electrodes of said second solid state electric valve.

5. In a signal responsive network; an input device delivering an output signal including a component varying substantially exponentially with ambient temperature and a component varying under the control of an input signal; means for impressing an input signal on said input device; a semi-conductor amplifier having base, emitter and collector electrodes; a network including a load device, a source of potential and a thermally variable resistance connected between said collector and said emitter with said resistance connected at one end to said emitter; and means for impressing the output of said input device between said base and the end of said resistance remote from said emitter; said resistance varying with temperature substantially according to the rule:

$$R=\frac{5400}{I_0}+\frac{369,000}{T+38.5\,I_0}\text{ ohms}$$

where T is the temperature of said resistance expressed in degrees centigrade and $I_0$ is the current, expressed in milliamperes, traversing said load device in the absence of signal input to said input device.

6. In a signal responsive network; an input device delivering an output signal including a component varying substantially exponentially with ambient temperature and a component varying under the control of an input signal; means for impressing an input signal on said input device; a semi-conductor amplifier having base, emitter and collector electrodes; a network including a load device, a source of potential and a thermally variable resistance connected between said collector electrode and said emitter electrode with said resistance connected at one end with said emitter electrode; and means for impressing the output of said input device between said base electrode and the end of said resistance remote from said emitter; said resistance varying with temperature substantially according to the rule:

$$R=\frac{A}{I_0}+\frac{B}{T+CI_0}\text{ ohms}$$

where T is the temperature of said resistance expressed in degrees centigrade; $I_0$ is the current expressed in milliamperes traversing said load device in the absence of signal input to said input device; and A, B and C are constants with A at least one order of magnitude greater than C, and B at least one order of magnitude greater than A.

7. In a signal responsive network; an input device delivering an output signal including a component varying substantially exponential with ambient temperature and a component varying under the control of an input signal; means for impressing an input signal on said input device; a semi-conductor amplifier having base, emitter and collector electrodes; a network including a load device, a source of potential and a thermally variable resistance connected between said collector electrode and said emitter electrode with said resistance connected at one end with said emitter electrode; and means for impressing the output of said input device between said base electrode and the end of said resistance remote from said emitter; said resistance varying with temperature substantially according to the rule:

$$R=\frac{A}{I_0}+\frac{B}{T+CI_0}\text{ ohms}$$

where T is the temperature of said resistance expressed in degrees centigrade; $I_0$ is the current expressed in milliamperes traversing said load device in the absence of signal input to said input device; and A, B and C are constants with A approximately two orders of magnitude greater than C and B approximately four orders of magnitude greater than C.

References Cited in the file of this patent

UNITED STATES PATENTS

| | | |
|---|---|---|
| 2,468,082 | Chatterjea et al. | Apr. 26, 1949 |
| 2,533,001 | Eberhard | Dec. 5, 1950 |
| 2,585,078 | Barney | Feb. 12, 1952 |
| 2,647,958 | Barney | Aug. 4, 1953 |
| 2,693,572 | Chase | Nov. 2, 1954 |

FOREIGN PATENTS

| | | |
|---|---|---|
| 140,501 | Sweden | May 26, 1953 |

OTHER REFERENCES

Shea Text, "Principles of Transistor Circuits," pages 164–179, pub. 1953 by John Wiley & Sons, N. Y. C.